United States Patent [19]

Date et al.

[11] 4,351,597

[45] Sep. 28, 1982

[54] CAMERA HAVING ELECTROMAGNETIC RELEASE CONTROL

[75] Inventors: Nobuaki Date; Hiroshi Aizawa, both of Kawasaki; Masanori Uchidoi, Yokohama; Yoshiaki Watanabe, Fujisawa, all of Japan

[73] Assignee: Canon Kabushiki Kaisha, Tokyo, Japan

[21] Appl. No.: 4,269

[22] Filed: Jan. 17, 1979

Related U.S. Application Data

[63] Continuation of Ser. No. 811,303, Jun. 29, 1977, abandoned.

[30] Foreign Application Priority Data

Jun. 30, 1976 [JP] Japan ................................. 51-77189

[51] Int. Cl.³ ............................................. G03B 17/40
[52] U.S. Cl. ................................... 354/266; 354/234
[58] Field of Search ................. 354/23 D, 43, 51, 173, 354/238, 258, 266–269, 271, 171, 234, 235, 212; 352/121, 137, 141, 175, 169

[56] References Cited

U.S. PATENT DOCUMENTS 3,726,200 4/1973 Ogiso et al. ........................... 354/51

FOREIGN PATENT DOCUMENTS 2530623 2/1976 Fed. Rep. of Germany .

Primary Examiner—L. T. Hix
Assistant Examiner—William B. Perkey
Attorney, Agent, or Firm—Toren, McGeady & Stanger

[57] ABSTRACT

A release control device for controlling initiation of a release of various portions of a camera by means of an electromagnet. When a shutter release button is maintained depressed to make a continuous series of frame exposures as by the help of a motor drive unit, the device defers initiation of each release operation pending completion of the returning movement of a resetting mechanism to its idle position.

7 Claims, 7 Drawing Figures

CAMERA HAVING ELECTROMAGNETIC RELEASE CONTROL

This is a continuation of application Ser. No. 811,303 filed on June 29, 1977, now abandoned.

BACKGROUND OF THE INVENTION

1. Field of the Invention

This invention relates to photographic cameras, and more particularly to an electromagnetically operating release control device for such camera which enables a film winding-up operation not to interfere with a releasing operation subsequent thereto.

2. Description of the Prior Art

Most of the release mechanisms for photographic cameras are designed to be made actuable after a film winding up operation has been completed. This design feature is also employed in a camera provided with an electromagnetically operating release mechanism so that a release therefor operation is initiated at the simultaneous occurrence of two distinctive signals from respective means cooperating with a shutter release button and a film winding lever as these signals are applied to a control means for a single electromagnet in the release mechanism. This control means takes usually an AND gate circuit form so that, upon simultaneous reception of the above identified two signals, an output signal is produced which is utilized in controlling an actuation of the electromagnet.

The release mechanism of such construction must be provided with control means for coordination with a resetting mechanism having a manually operating member which is common to a film advancing mechanism, that is, the film winding lever, or otherwise a film winding up operation would often interfere with a camera releasing operation subsequent thereto when the film winding lever is operated while the shutter release button remains depressed either accidentally or intentionally. This is particularly true when the camera is driven by a motor drive unit. In other words, as the film winding up lever must be over-cocked past the end of a film winding stroke to effect the returning movement of the resetting mechanism to its idle position, a release of an automatic diaphragm control mechanism, a mirror drive mechanism, a shutter control mechanism and the like is caused to start at the time when movement of the film winding lever has reached the above identified stroke end, provided that this time occurs during the depression of the shutter release button. It is known to provide such coordination control means in the form of a delay circuit having a time constant necessary for the film winding lever to move from the stroke end to an over-cocked position where the film advancing mechanism assumes its starting position and arranged between the AND gate circuit and the electromagnet. This conventional arrangement of the delay circuit has a disadvantage such that even when the completion of the film winding up operation is followed by the depression of the shutter release button, duration of an unnecessary delay time interval occurs from the depression of the shutter release button to the actuation of the shutter mechanism.

Accordingly, the present invention has for its general object to eliminate the above mentioned disadvantage of the conventional camera.

According to an aspect of the invention, operation signal forming means produce an operation signal in response to operation of a release button, winding signal forming means produce a winding signal in response to operation of a film winding mechanism, delay means respond to the winding signal to produce a delay signal or predetermined time after the winding signal, gate means produce a release signal upon receiving the operation and delay signals, and power supply control means energize electromagnetic release means in response to the release signal.

By virtue of these features initiation of the electromagnetic release means is deferred by a time interval slightly longer than necessary for the film winding lever to move from the film advancing stroke end to the over-cocked position at normal speed. Thus, the electromagnetic release is initiated by the shutter release button when the film winding operation is followed by depression of the button.

According to another aspect of the invention, the delay means include a time constant circuit composed of a resistor and a capacitor. According to another aspect of the invention the gate means is in the form of an AND circuit.

According to another aspect of the invention, first input means produce a winding completion signal and second input means produce a release actuation signal. A flip-flop produces a high signal from a first output terminal when a signal from the first input means is applied to a first input terminal and produces a high signal from a second output terminal when a signal from the second input means is applied to a second input terminal. First gate means produce a signal in response to simultaneous receipt of the winding completion signal and the release actuating signal. Second gate means produce a signal when both a winding completion signal and the high signal from the first output terminal are applied thereto. Third gate means produce a signal in response to simultaneous receipt of signals from the first input means and the second output terminal. Electromagnetic release means actuate the operating mechanism of the camera from either the second gate means and the third gate means, and delay means between the electromagnetic release means and the second release means apply the signal from the second gate means to the electromagnetic release means only after a predetermined time has passed.

According to another aspect of the invention, the first and second input means have respective pulse generating means connected to the respective input terminals of the flip-flop circuit.

According to another aspect of the invention, fourth gate means apply a signal to the electromagnetic release means when one of the signals from the delay means and the third gate means is applied thereto.

According to another aspect of the invention, second delay means apply a signal to the second gate means and the third gate means after the output of the first gate means is delayed by a predetermined time.

According to still another aspect of the invention, a mode selector switch between the first delay means and the fourth gate means has one position for continuous sequential operation.

These and other objects and features of the present invention will become apparent from the following detailed description of preferred embodiments of the invention taken in conjunction with the accompanying drawings in which:

DESCRIPTION OF THE PREFERRED EMBODIMENTS

Figure 1:
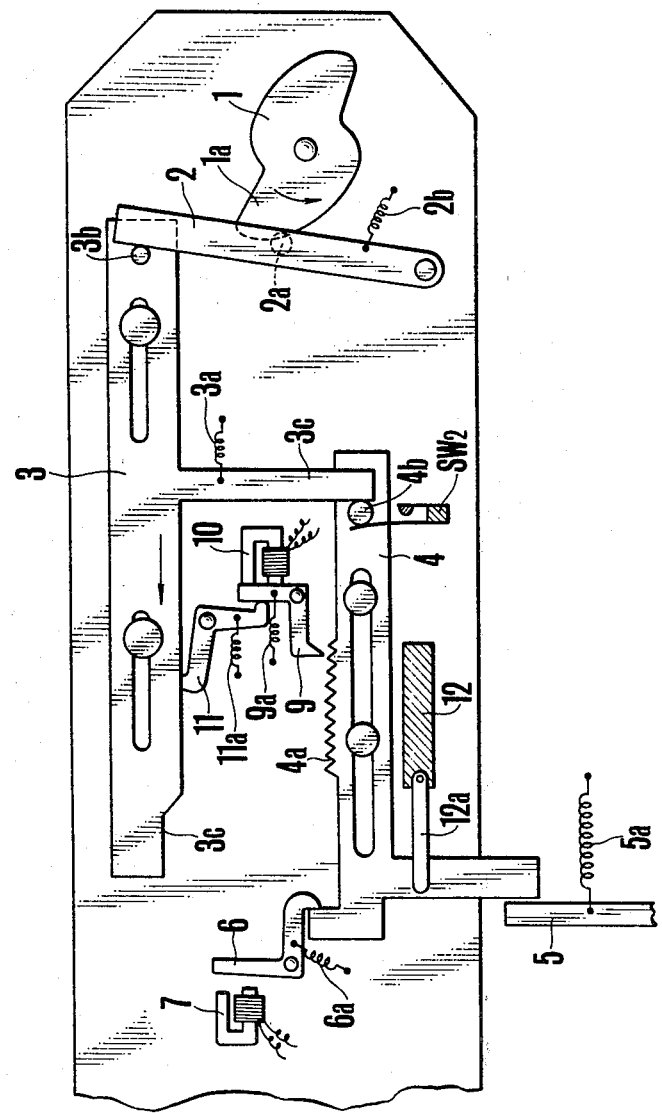
FIG. 1 is a schematic elevational view of an electrical diaphragm scanning mechanism, a resetting mechanism and a film winding up control member of a camera with which mechanical parts of an electromagnetic release control device are associated.

Referring to FIG. 1, there is shown an example of mechanical arrangement of an electromagnetic release control device of the invention as associated with an automatic diaphragm control mechanism in particular with an electrical diaphragm scanning mechanism of the camera. As is well known in the art, the film winding mechanism of the camera comprises a shaft not shown having an operating lever not shown connected to the top end thereof through a one-way clutch, the opposite end of which fixedly carries a cam disc 1 having two poles. During one cycle of a film winding operation, the disc 1 is rotated 180° in a counter-clockwise direction as viewed in FIG. 1 past the end of a film feed stroke, that is, the illustrated position corresponding to the start position of the diaphragm scanning mechanism, but where the resetting mechanism still remains in an active position.

The resetting mechanism includes a control lever 2 having a central pin 2a and biased by a spring 2b in a clockwise direction to urge the pin 2a for normally abutting engagement with the camming surface of disc 1, and a resetting slide 3 having two longitudinally elongated slots through which respective pins extend to guide the slide 3 for horizontal movement and biased by a spring 3a for movement to the right to produce a motion transmitting engagement between a pin 3b extending from slide 3 and the control lever 2. The resetting slide 3 has an arm 3c extending into the path of movement of a pin 4b which serves not only to transmit a resetting motion from slide 3 to a scanning slide 4 but also to actuate a switch $SW_2$ constituting part of the release control device of the invention.

The electrical diaphragm scanning mechanism further includes a diaphragm presetting member 5 biased by a spring 5a for engagement with an arm of the scanning slide 4 so that when slide 4 is released from a latching lever 6 to move to the right in response to the action of spring 5a, a resistance track 12 is scanned by a brush 12a fixedly mounted on the scanning slide 4 and the scanning result is introduced through lever 5 to the diaphragm mechanism of the camera. To arrest the moving slide 4 when the scanned diaphragm value coincides with the computed exposure value, a lever 9 having a pawl is arranged to engage one of the teeth 4a formed as a rack in a side portion of slide 4 in response to the action of a spring 9a when an electromagnet 10 is deenergized. This movement of lever 9 occurs only when an escapement lever 11 has been turned from the illustrated position by the force of a spring 11a because the resetting slide 3 has returned to its idle position where the escapement lever 11 drops at its tail into a cutout 3d formed in a corner portion of slide 3 causing its head to be moved away from the arresting lever 9. Actuation of the latching lever 6 is controlled by an electromagnet 7 constituting part of the release control device of the invention.

Figure 2:
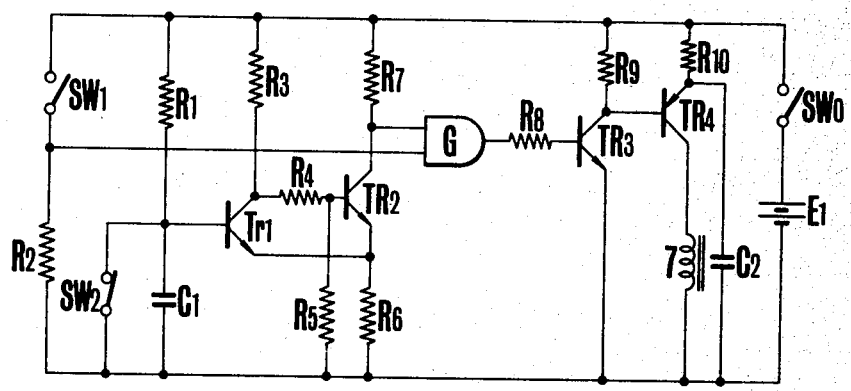
FIG. 2 is an electrical circuit diagram of one embodiment of the electromagnetic release control device according to the present invention with an electromagnet and one of two signal producing switches thereof being shown in FIG. 1.

FIG. 2 shows the circuitry of one embodiment of the release control device according to the invention including an electrical power supply source or battery $E_1$, a master switch $SW_0$ connected between the positive terminal of battery $E_1$ and a positive bus, a first signal generator consisting of the mechanical switch $SW_2$ of FIG. 1, an electronic switch having an input connected through a delay circuit to the switch $SW_2$, and a resistor $R_7$ connected in the output stage of the electronic switch, and a second signal generator consisting of a mechanical switch $SW_1$ and a resistor $R_2$ connected in series with each other between the positive and negative buses, the switch $SW_1$ being arranged to be closed when a shutter release button not shown is depressed. The delay circuit comprises a resistor $R_1$ and a capacitor $C_1$ connected in series with each other between the positive and negative buses. The electronic switch comprises a first transistor $Tr_1$ having a base connected to the output of the delay circuit, having a collector connected through a resistor $R_3$ to the positive bus, and having an emitter connected through a resistor $R_6$ to the negative bus, and a second transistor $Tr_2$ having a base connected both to the collector of first transistor $Tr_1$ through a resistor $R_4$ and to the negative bus through a resistor $R_5$, having a collector connected to the resistor $R_7$, and having an emitter connected through the resistor $R_6$ to the negative bus. The outputs of the first and second signal generators are applied to respective inputs of an AND gate G having an output connected through a resistor $R_8$ to an input of a switching circuit for controlling energization of the solenoid of the electromagnet 7. The switching circuit comprises a first transistor $Tr_3$ having a base connected to the resistor $R_8$, having an emitter connected to the negative bus and having a collector connected through a resistor $R_9$ to the positive bus, and a second transistor $Tr_4$ having a base connected to the collector of first transistor $Tr_3$, having an emitter connected through a resistor $R_{10}$ to the positive bus and having a collector connected to the negative bus through the solenoid of electromagnet 7. To effect sudden energization of the solenoid, there is provided a capacitor $C_2$ connected between the emitter of the second transistor $Tr_4$ and the negative bus.

The operation of the electromagnetic release control device of FIG. 1 and FIG. 2 will next be explained by reference to FIG. 3 and FIG. 4, wherein input terminals 21 and 22 of FIG. 3 receives respective signals on lines (a) and (c), or on lines (e) and (g) of FIG. 4 from the switches $SW_2$ and $SW_1$ of FIG. 2 respectively, and a block 23 representing the delay circuit and the electronic switch of FIG. 2 and responsive to the signal from the input terminal 21 produces an output signal on line (b) or (f), while the AND gate G responsive to the simultaneous occurrence of the signals from block 23 and input terminal 22 produces an output signal on line (d) or (h).

At first, the film winding mechanism is assumed to be operated manually with the film winding operation being followed by depression of the shutter release button. After the master switch $SW_0$ is closed, the operator may turn the film winding lever while the cam disc 1 being driven to rotate in the direction indicated by the arrow with simultaneous counter-clockwise movement of the control lever 2 which in turn causes leftward movement of the resetting slide 3 along with the scanning slide 4. It is to be noted here that as soon as the leftward movement of resetting slide 3 is initiated, the escapement lever 11 is turned counter-clockwise against the force of spring 11a, causing disengagement of the lever 9 from the rack 4a at its pawl, the tail of which is brought into the active field of the electromagnet 10. At the end of a stroke length necessary to advance the film through one frame, the disc 1 assumes the illustrated position where the scanning slide 4 is reset by engagement with the latching lever 6 and the switch $SW_2$ is opened by the pin 4b at a time designated $t_1$ in FIG. 4 to apply a signal (a) to the input terminal 21 of FIG. 3. By this time, $t_1$, the other portions of the camera such as the shutter mechanism and the solenoid of electromagnet 10 is energized to hold the arresting lever 9 in the retracted position against the force of spring 9a. Within a time interval from the time $t_1$ dependent upon the time constant of the timing circuit $R_1$ and $C_1$, the disc 1 is further rotated to accomplish one cycle of film winding operation with the result that the cam follower pin 2a slides down from the peak of the cam pole 1a to the valley, thereby the resetting slide 3 is permitted to return to the rightmost position where the arm 3c is out of the path of movement of the pin 4b, and then the escapement lever 11 is turned clockwise as its tail enters the recessed portion 3d, thus being moved away from the arresting lever 9. At the termination of duration of the delay time, that is, at a time, $t_2$, of FIG. 4, the first and second transistors $Tr_1$ and $Tr_2$ of the electronic switch are rendered conductive, non-conducting respectively to apply a voltage of high level or signal (b) on the first input terminal of AND gate G. In a desired time interval from the completion of the film winding operation, the operator may actuate the shutter release button to close the switch $SW_1$, thereby a voltage of high level or signal (c) is applied to the second input terminal of AND gate G at a time $t_3$ which then produces an output or signal (d) at the same time $t_3$. Responsive to the output signal (d) of AND gate G, the switching circuit, $R_9$, $R_{10}$, $Tr_3$ and $Tr_4$ begins to energize the solenoid of electromagnet 7.

As the latching lever 6 is turned counter-clockwise against the force of spring 6a by the energized electromagnet 7, a release of the diaphragm scanning slide 4 together with the mirror drive mechanism not shown is initiated. Thereafter, the slide 4 is moved at a moderate speed with simultaneous movement of the diaphragm presetting lever 5 under the action of the common spring 5a, while the resistance track 12 being scanned by the brush 12a. When the position of lever 5 as determined by the scanning mechanism 4, 12 has reached the coincidence with an exposure value derived by computation from the preselected exposure control factors such as of object brightness information and shutter speed information, the electromagnet 10 is deenergized causing the arresting lever 9 to stop the slide 4 from further movement, thus the final position of the diaphragm presetting lever 5 provides the proper aperture value to which the diaphragm mechanism is to be adjusted when a closing down member not shown is automatically operated. Subsequent thereto, the shutter mechanism is operated to initiated an exposure. It will be appreciated that actuation of the shutter release button can be followed by initiation of an exposure without unduly long time lag therebetween despite of the provision of the delay circuit.

Figure 4:
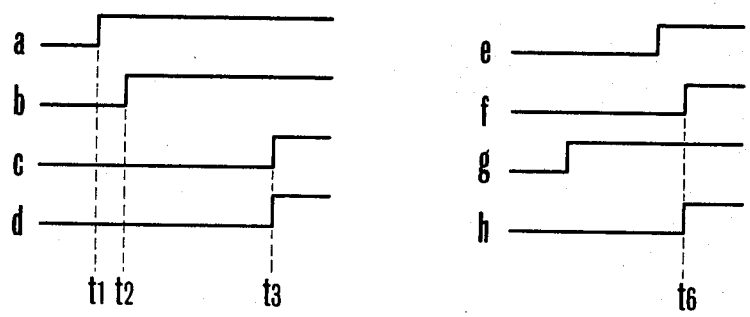
FIG. 4 is a signal timing chart of the various parts of the circuit of FIG. 3.

Assuming alternatively that the camera is driven by a motor drive unit to make a continuous series of frame exposures with the shutter release button being maintained depressed therethrough, the second input 22 of AND gate G is made continuously receptive of a high level voltage as shown on line (g) in FIG. 4 from the first signal generator including $SW_2$. For each actuation of camera release, therefore, the switch $SW_2$ is once opened to apply a signal (e) on the delay circuit 23. In a time interval equal to the difference between the times, $t_1$ and $t_2$, the delay circuit 23 produces a high level voltage as shown on line (f) at a time, $t_6$. Upon advent of this signal (f) on the first input of AND gate G, the AND gate G produces an output signal (h), causing initiation of the camera release at the same time $t_6$. It will be appreciated that the release control device of the invention defers initiation of a release of the various portions of the camera pending completion of returning movement of the resetting slide 3 and the escapement lever 11 which occurs within the time interval between the opening of switch $SW_2$ and the appearance of an actuating signal (h) at the output terminal of AND gate G, thereby it being made possible to avoid occurrence of mechanical interference between the resetting mechanism and the diaphragm scanning mechanism.

Figure 3:
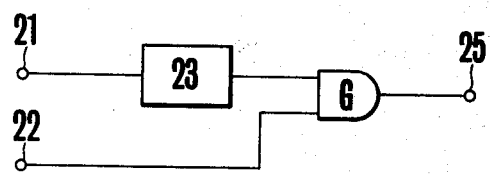
FIG. 3 is a block diagram showing an electrical arrangement of the essential parts of the circuit of FIG. 2.
Figure 5:
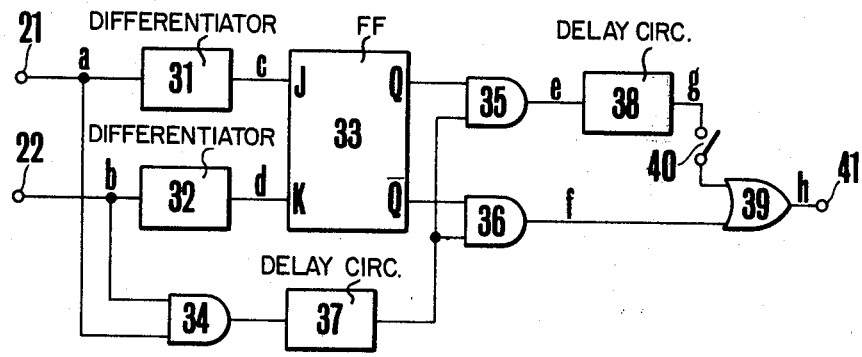
FIG. 5 is a block diagram of those circuit portions of another embodiment of the invention which may be substituted for those in FIG. 3.

FIG. 5 shows the essential portions of another embodiment of the release control circuit which is different from FIG. 3 embodiment in that the camera may be automatically driven for single frame operation. The circuit design feature of this embodiment is based on the facts that when the camera is set for motion picture-like operation, initiation of each camera release is controlled by the first signal generator including the switch $SW_2$, and that when the camera is set for single frame operation either in the manual or in the automatic mode, it is controlled by the first signal generator cooperative with the shutter release button, and therefore characterized by making use of a signal precedence discriminator of sequence indicator in this instance, with inclusion of a JK type flip-flop 33.

The flip-flop 33 has two input terminals: the first designated J is connected through a first differentiator 31 to the first input terminal 21, and the second designated K is connected through a second differentiator 32 to the second input terminal 22. By these differentiators 31 and 32, stepped signals (a) and (b) (see FIG. 6) appearing at the respective input terminals 21 and 22 are converted to pulsated signals (c) and (d) respectively. Two output terminals Q and $\bar{Q}$ of flip-flop 33 are connected to respective one input terminals of AND gates 35 and 36, the other input terminals of which are connected to a common output terminal of a delay circuit 37 having a time constant equal to that necessary to process the input signals through the differentiator 31 or 32 and the flip-flop 33. An input terminal of the delay circuit 37 is connected through an AND gate 34 to both of the input terminals 21 and 22. An output terminal of the AND gate 35 is connected through a delay circuit 38 corresponding to that 23 of FIG. 3 and through a mechanical switch 40 to one of two input terminals of an OR gate 39, the other input terminal of which is connected directly to an output terminal of the AND gate 36. The switch 40 is arranged to be opened when the camera is set for single frame operation in the automatic mode. The output terminal 41 of the OR gate 39 corresponds to that 25 of FIG. 3.

Figure 6:
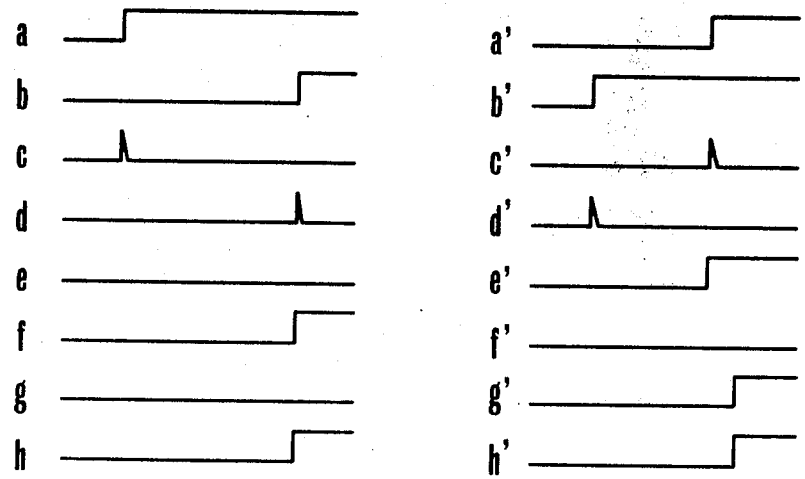
FIG. 6 is a signal timing chart of the various parts of the circuit of FIG. 5.

The operation of the circuit of FIG. 5 will next be explained in connection with the signal timing chart of FIG. 6. When the camera is set for single frame operation in the automatic mode, the switch 40 is opened. As the switch $SW_2$ of FIG. 1 is previously opened, the first input terminal 21 takes a signal on line (a) in FIG. 6 before the time at which the shutter release button is depressed to produce a signal on line (b). Upon advent of a pulse (c) on the input terminal J of flip-flop 33, outputs of binary levels "1" and "0" are caused to appear the output terminals Q and $\overline{Q}$ of flip-flop 33 respectively. During the time interval between the completion of one cycle of film winding operation and the depression of the shutter release button, the AND gate 34 produces no output of "1" level so that the AND gates 35 and 36 are maintained gated off therethrough.

When the shutter release button is depressed, a signal on line (b) appears at the input terminal 22 which after converted to a pulse (d) by the differentiator 32 is then applied to the input terminal K of flip-flop 33, thereby the outputs Q and $\overline{Q}$ are inverted to "0" and "1" respectively, while the AND gate 34 is gated on by the simultaneous occurrence of signals (a) and (b) to produce an output of "1" level which after processed by the delay circuit 37 is then applied to the second input terminals of the AND gates 35 and 36 after the appearance of the inverted outputs Q and $\overline{Q}$. As a result, the AND gate 35 remains gated off, but the AND gate 36 is gated on to pass the "1" output $\overline{Q}$ to the OR gate 39 as shown on lines (e) and (f) respectively. This output is taken off from the output terminal 41 and utilized to actuate the switching circuit of FIG. 2 as shown on line (h).

After an exposure has been completed, the film winding mechanism is rendered automatically operative to open the switch $SW_2$. Assuming that the shutter release button is maintained depressed until this time, appearance of a signal (a') at the first input terminal 21 is preceded by appearance of a signal (b') at the second input terminal 22 so that the outputs Q and $\overline{Q}$ of flip-flop 33 take "1" and "0" respectively. In a very short time interval from the closure of switch $SW_2$, a signal (e') appears at the output terminal of AND gate 35 which is applied to the delay circuit 38. At the termination of duration of the delay time referred to above the delay circuit 38 produces a signal (g). As the switch 40 is opened, no camera release takes place.

When the switch 40 is previously closed to make a continuous series of frame exposures, the output of the delay circuit can be used to actuate the switching circuit of FIG. 2. Such procedure repeats itself until the shutter release button is released from the depression. It is to be noted that instead of using the shutter release button, it is of course possible to use a control member provided in a motor drive unit attached to the camera.

Figure 7:
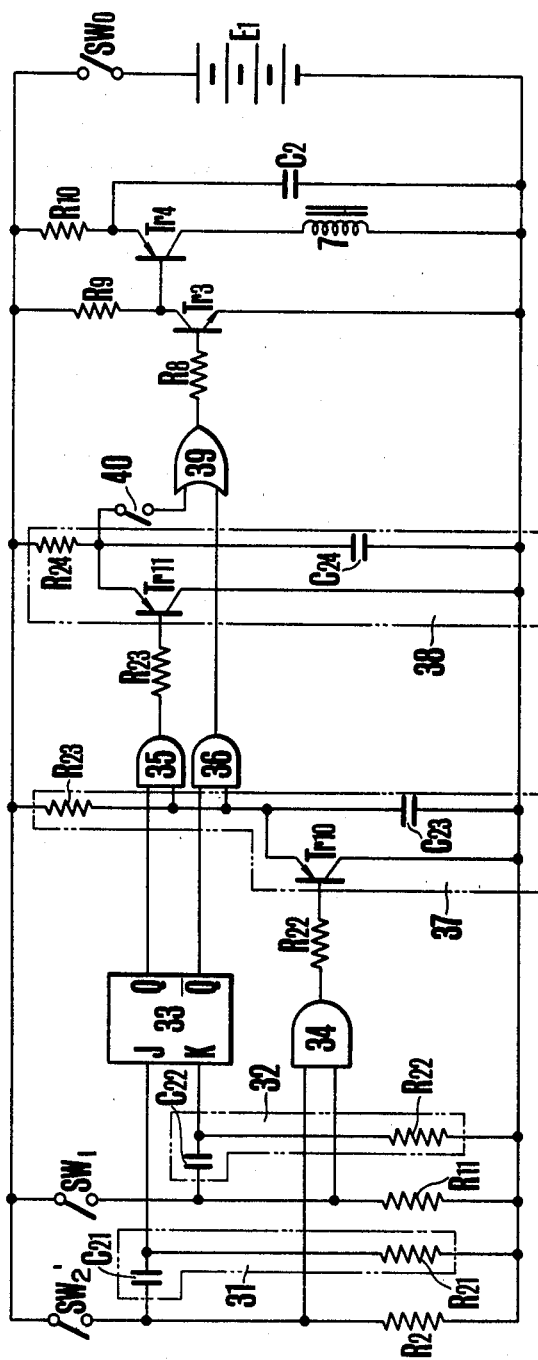
FIG. 7 is an electrical circuit diagram of a practical example of the circuit of FIG. 5 constituting together with the other necessary parts a completed electromagnet release control device of the invention.

FIG. 7 shows a specific example of the circuit of FIG. 5 in combination with a number of circuit elements necessary to complete the circuitry of an electromagnetic release control device of the invention, wherein the same reference numerals have been employed to denote the similar parts to those shown in FIG. 2 and FIG. 5. The first differentiator 31 consists of a capacitor $C_{21}$ and a resistor $R_{21}$ connected in series to each other and to the switch $SW_1$. A point on connection between the capacitor $C_{21}$ and the resistor $R_{21}$ is connected to the input terminal J of flip-flop 33. The second differentiator 32 consists of a capacitor $C_{22}$ and a resistor $R_{22}$ connected in series to each other and to the switch $SW_2$. A point on connection between the capacitor $C_{22}$ and the resistor $R_{22}$ is connected to the input terminal K of flip-flop 33. The delay circuit of shorter time constant 37 consists of a resistor $R_{23}$, a capacitor $C_{23}$ connected in series to the resistor $R_{23}$ and a switching transistor $Tr_{10}$ connected across the capacitor and having a base connected through a resistor $R_{22}$ to an output terminal of the AND gate 34. The delay circuit of longer time constant 38 consists of a resistor $R_{24}$, a capacitor $C_{24}$ connected in series to the resistor $R_{24}$, and a transistor $Tr_{11}$ connected across the capacitor $C_{24}$ and having a base connected through a resistor $R_{23}$ to the output terminal of the AND gate 35.

It will be seen from the foregoing that the present invention provides a photographic camera with an electromagnetic release system having special coordinating controls for assurance of reliable diaphragm scanning operation without resorting to elaborate reset operations as the release actuator may be manipulated at any time, for example, before completion of one cycle of film winding operation. Further, the present invention contemplates to provide an electromagnetically operating release control device specially adapted to the purpose of rendering the camera operative with a motor drive unit while permitting selection of one of the motion picture like mode and the single frame mode.

What is claimed is:

1. An electromagnetic release device for a camera, comprising:
    release operation signal generating means for generating a signal in response to a release operation;
    wind-up completion signal generating means for generating a signal in response to completion of a wind-up operation;
    discriminating means for receiving the signal from the release operation signal generating means and the signal from the wind-up completion signal generating means, for determining which of the two signals is received later, and for generating a release signal in response to the signal which is received later;
    said discriminating means having delay means so as to generate the release signal after a lapse of time set by the delay means when the signal received later is the signal from the wind-up completion signal generating means, and immediately to generate the release signal when the signal received later is the signal from the release operation signal generating means;
    electromagnetic release means for actuating internal mechanisms in the camera, and
    control means for actuating the electromagnetic release means in response to the release.

2. An electromagnetic release device for a camera comprising:
    release operation signal producing means for producing a signal in response to a shutter release operation;

winding completion signal producing means for producing a signal in response to completion of a film winding action;

delay means which is unresponsive to the signal produced by said release operation signal producing means and responsive to the signal produced by said winding completion signal producing means for producing a signal a predetermined period of time after receipt of the signal from said winding completion signal producing means;

gate means having a first and a second input terminal for receiving the signal from said release operation signal producing means applied at the first input terminal and for receiving the signal from said delay means at the second input terminal, and for producing a release signal when said gate means receives both of the signals from said release operation signal producing means and said delay means, the gate means being arranged to produce said release signal concurrently with receipt of the signal from said release operation signal producing means when the signal from the release operation signal producing means is received after a lapse of a predetermined period of time delayed by said delay means and to produce said release signal in response to the signal produced by the delay means after the lapse of the predetermined period of time when the signal from the release operation signal producing means is received prior to the lapse of said predetermined period of time delayed by the delay means;

electromagnetic release means arranged to actuate a mechanism provided inside the camera; and power supply control means for controlling the power supply to said electromagnetic release means, and for supplying power to the electromagnetic release means when the release signal from said gate means is applied thereto, said electromagnetic release means for operating immediately in response to a release operation when said release operation is performed a predetermined period of time after completion of said film winding action and to operate after the lapse of the predetermined period of time in response to the signal from the delay means when said release operation is performed prior to the lapse of the predetermined period of time.

3. An electromagnetic release device for a camera having an operating mechanism including:

(a) first input means for producing a winding completion signal;

(b) second input means for producing a release actuation signal;

(c) a flip-flop having a first input terminal and a second input terminal to which the signals from said first input means and said second input means are applied, said flip-flop having a first output terminal and a second output terminal and producing a high level signal from the first output terminal when the signal from the first input means is applied to the first input terminal and a high level signal from the second output terminal when the signal from the second input means is applied to the second input terminal;

(d) first gate means for producing a signal when both of the signals from said first input means and said second input means are applied thereto;

(e) second gate means for producing a signal when both of the signals from said first gate means and the high level signal of the first output terminal of said flip-flop are applied thereto;

(f) third gate means for producing a signal when both of the signals from said first gate means and the high level signal of the second output terminal of said flip-flop are applied thereto;

(g) electromagnetic release means responsive to signals applied thereto for actuating the operating mechanism of the camera, said means being operated by signals of said third gate means; and (h) delay means between said electromagnetic release means and said second gate means for applying the signal from said second gate means to said electromagnetic release means after a predetermined time has passed.

4. A device according to claim 3, wherein said first input means includes first pulse generating means connected to said first input terminal of said flip-flop circuit, and said second input means having second pulse generating means connected to said second input terminal of said flip-flop circuit.

5. A device according to claim 3, further including fourth gate means for applying a signal to said electromagnetic release means when one of the signals of said delay means and the third gate means is applied thereto.

6. A device according to claim 3, further including second delay means for applying a signal to the second gate means and the third gate means after the output of said first gate means is delayed by a predetermined time.

7. A device according to claim 5 for a camera capable of continuous sequential operation, and further including mode selector switch between said delay means and said fourth gate means and having one position for continuous sequential operation.

* * * * *